L. S. FLATAU.
AUTOMOBILE WHEEL TIRE.
APPLICATION FILED SEPT. 14, 1906.

1,116,256.

Patented Nov. 3, 1914.
2 SHEETS—SHEET 1.

Inventor:
Louis S. Flatau.

Witnesses:

UNITED STATES PATENT OFFICE.

LOUIS SPENCER FLATAU, OF ST. LOUIS, MISSOURI.

AUTOMOBILE WHEEL-TIRE.

1,116,256. Specification of Letters Patent. Patented Nov. 3, 1914.

Application filed September 14, 1906. Serial No. 334,651.

*To all whom it may concern:*

Be it known that I, LOUIS S. FLATAU, a citizen of the United States, residing at St. Louis, in the State of Missouri, have invented certain new and useful Improvements in Automobile Wheel-Tires, of which the following is a specification.

My invention relates to improvements in tires for vehicle-wheels, more particularly for automobile or motor-vehicle wheels, which sustain considerable weight and require most effective traction upon the pavement or road. Its object, among other things, is to provide for its being readily substituted for the pneumatic type of tire, being adapted to be applied to the ordinary wooden felly of that class of wheels while it is equally applicable, of course, for the manufacture of wheels of this character without regard to wheels of any previous like, or other type; to provide for simplicity and durability, and yet form a wheel-tire which shall be easy running and relatively inexpensive, which, it is obvious, are desiderata; and to accomplish these ends with facility and in an effective manner.

Said invention consists of certain structural features or instrumentalities substantially as hereinafter fully disclosed and specifically pointed out by the claim.

Figure 1:
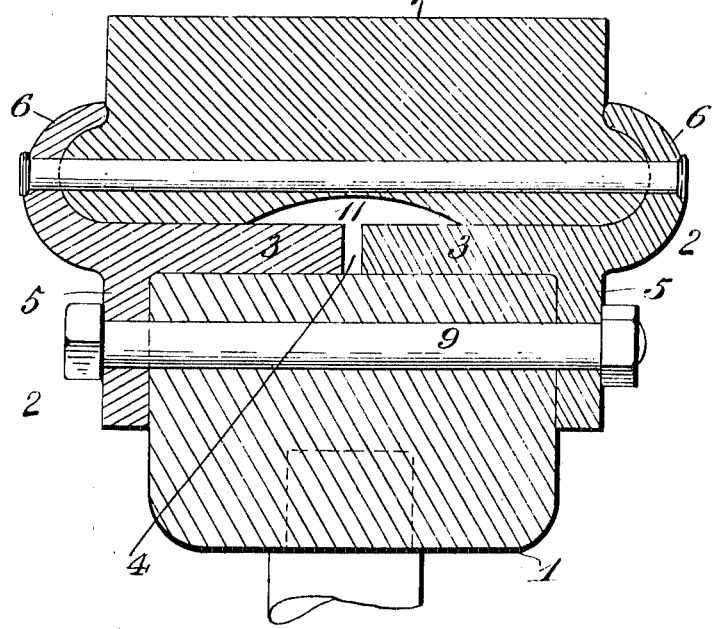
Figure 3:
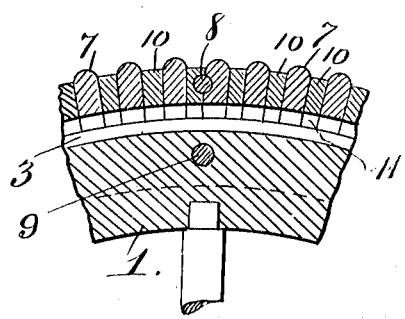
Figure 2:
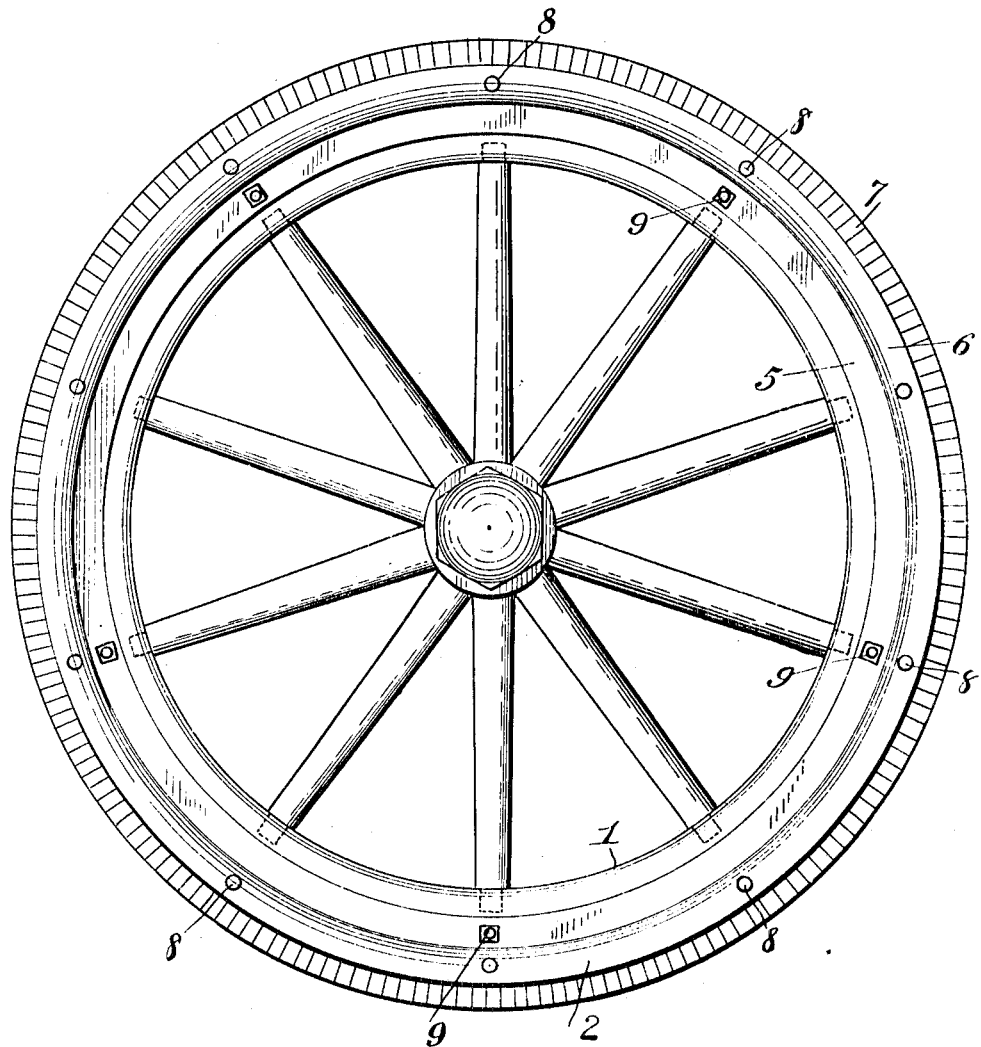

In the accompanying drawings illustrating the preferred embodiment of my invention—Figure 1 is a transverse sectional view thereof with parts broken away. Fig. 2 is a side view of the same. Fig. 3 is a fragmentary longitudinal section thereof.

In carrying out my invention, I provide for the application to the ordinary wooden felly 1 of a pneumatic tired wheel, after denuding it of its tubular or inflatable tire, of two preferably cast-steel half-rim members or sections 2 which may be made or formed of what is termed T-iron rolled for that purpose with irregular adjunctive parts so that they may be readily conformed to wheels of different diameters by the drop-forge process, templets or mandrels conformable to the required outlines, as will be readily appreciated. Each half-rim member or section, in addition to being circular, has the stem-portions 3 of its T-shaped cross-sectional outline adapted to conform to, and fitted upon the circumference of the wooden felly. The opposed or inner edges of the stem-portions 3 of the half-rim members or sections do not come in contact with each other, however, but are suitably spaced apart as at 4 to provide for effectively drawing thereon and for compensating shrinkage in tightening the same upon the wooden felly and securely "clenching" or gripping the outermost or tread sections of the tire, later described. Said rim-members or sections have each, one arm 5 of the cross-portion of its T-shaped outline, extending inward alongside of the wooden felly, the two arms thus being adapted to embrace or receive the latter in applying the rim-members to said felly, as may be done either at the outset, as in manufacturing wheels with this type of tire, or later to a wheel having this type of felly and equipped with the pneumatic or tubular form of tire, it only being required to previously denude said rim of its tire, preparatory for the reception of said half-rim members or sections, with the traction or tread sections referred to. The other arm 6 of each half-rim member or section is relatively curved first outward and then inward over rounded lateral extensions of the outermost or tread-sections or segments 7 of the tire, and finally gripped or "clenched" down upon said lateral extensions of said sections, thus, with the aid of rivets 8, effectively securing the latter in place in said half-rim members or sections. Said half-rim members or sections are, themselves, secured to the wooden felly 1 by bolts 9 passed therethrough and suitably nut-equipped. Said tread or traction sections 7 made preferably of blocks of rubber, may be of other material as wood, and may have interposed between them steel "partings" or wedges 10 for their compact or solid embedment within said half-rim members or sections, as will be readily understood. These rubber-blocks are each preferably recessed or have a portion of its inner surface or edge cut-away as at 11. The object of the cut-away portion in each of the resilient tread sections 7 is to permit of the sections being strengthened at their upper surfaces, rather than weakened when they are clamped between the rim members. The sections being of a resilient nature are compressible and the cutaway portions formed in the lower sides thereof permit the lower ends of the tread sections to be drawn toward each other and force the central portion of the tread sections upward and thereby increase the strength of the upper surfaces of the tread sections.

The aforesaid combination and arrangement of parts comprise a simple, compact and durable wheel, especially for vehicles of the character noted herein, as will be appreciated.

I claim—

The combination with a felly, of rim members having upper and lower flanges, means connecting the lower flanges to the felly, tread sections received between the upper flanges, each of said tread sections having a recess formed in its base forming a circumferential groove on the under side of the tread body, means passing through the upper flanges for fastening the sections in position and causing the central portion of the tread sections to be forced upwardly for strengthening the upper portion of the tread sections.

In testimony whereof I have signed my name to this specification in the presence of two subscribing witnesses.

LOUIS SPENCER FLATAU.

Witnesses:
B. J. Buss,
J. S. Carprew.